United States Patent [19]

Thomas

[11] Patent Number: 4,629,826
[45] Date of Patent: Dec. 16, 1986

[54] ALL PURPOSE WIRE CONCEALER

[76] Inventor: Junior A. Thomas, 55-30 98th Pl., Apt. 4-D, Flushing, N.Y. 11368

[21] Appl. No.: 767,829

[22] Filed: Aug. 21, 1985

[51] Int. Cl.$^4$ .......................... H02G 3/04; H02G 3/26
[52] U.S. Cl. .................................. 174/99 R; 138/108; 174/68 C; 248/225.2
[58] Field of Search ............... 174/48, 49, 68 C, 70 C, 174/72 C, 97, 99 R, 101; 52/221, 287; 138/108, 166; 339/23, 61 C; 248/68.1, 220.3, 222.2, 225.1, 225.2

[56] References Cited

U.S. PATENT DOCUMENTS 2,137,536 11/1938 McConnell ..................... 174/101 X

FOREIGN PATENT DOCUMENTS

| 730379 | 5/1932 | France ........................ 174/68 C |
| 15278 | of 1906 | United Kingdom ............ 248/225.2 |
| 881847 | 11/1961 | United Kingdom ............ 174/68 C |
| 919494 | 2/1963 | United Kingdom ............ 174/68 C |
| 1420216 | 1/1976 | United Kingdom ............ 174/68 C |

Primary Examiner—Laramie E. Askin
Attorney, Agent, or Firm—Richard L. Miller

[57] ABSTRACT

This invention is generally a longitudinally slit tubular molding member that can be opened up or closed so as to receive electric wires extending therethrough, and comprising a base mountable on a wall and a pivotable cover to enclose the wires, and including hooks for attaching the wires inside the molding member.

4 Claims, 5 Drawing Figures

U.S. Patent  Dec. 16, 1986  4,629,826
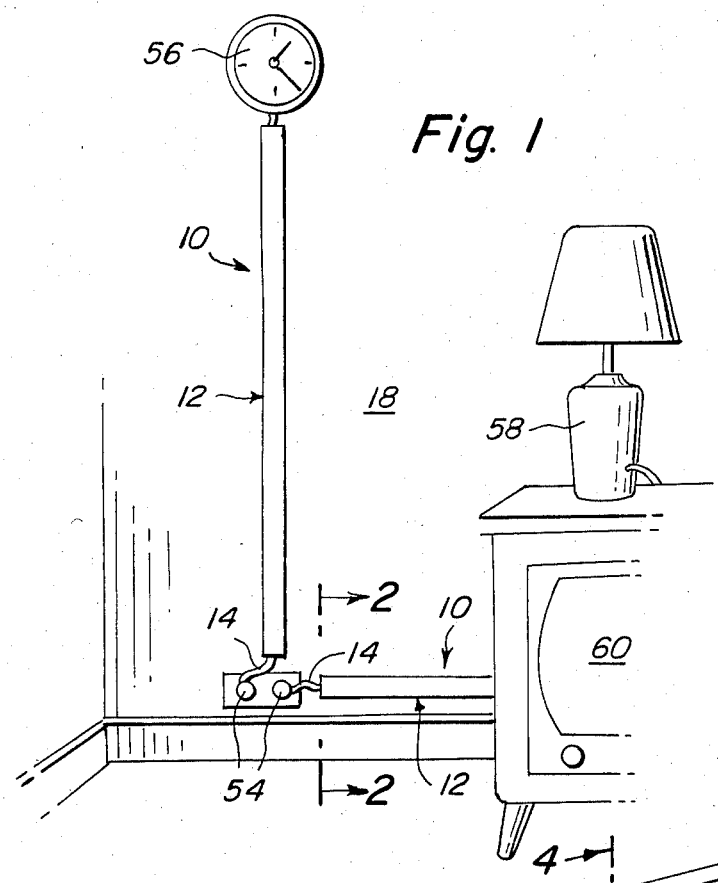
Fig. 1
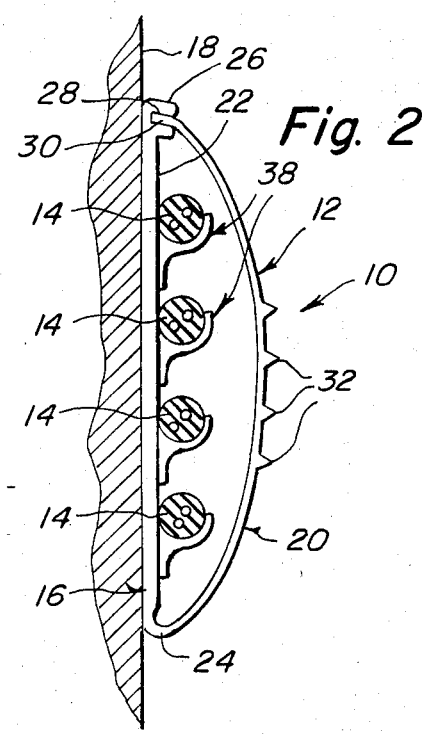
Fig. 2
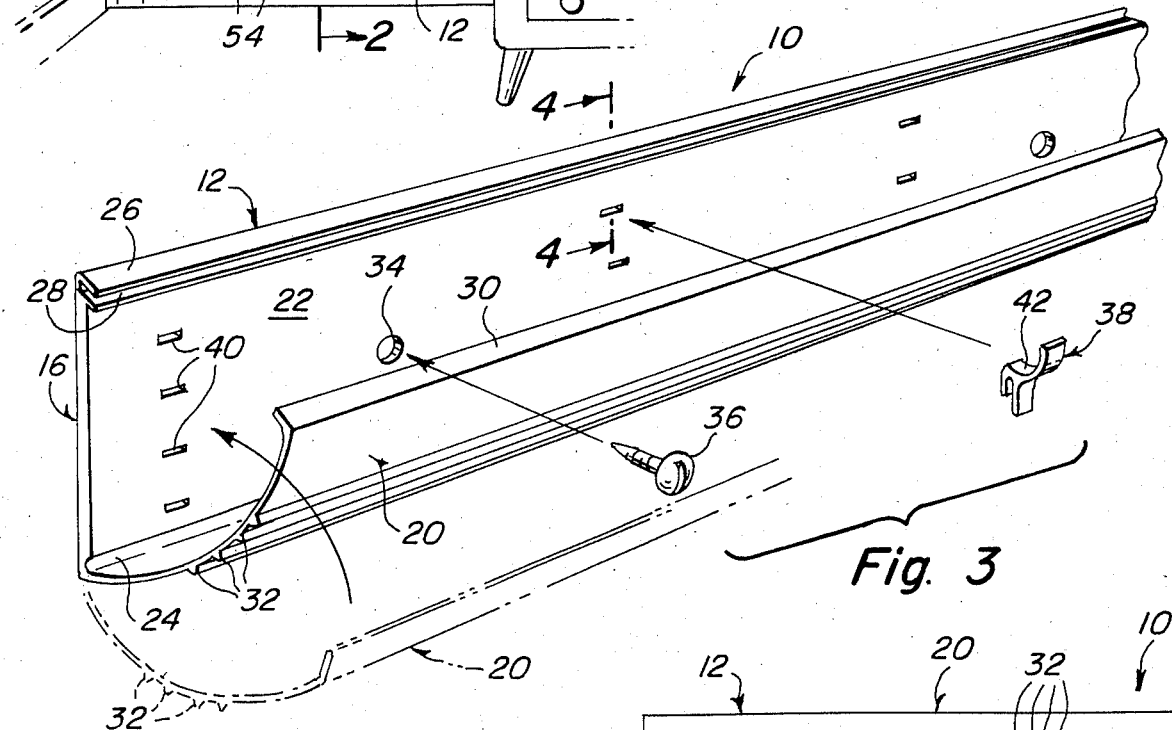
Fig. 3
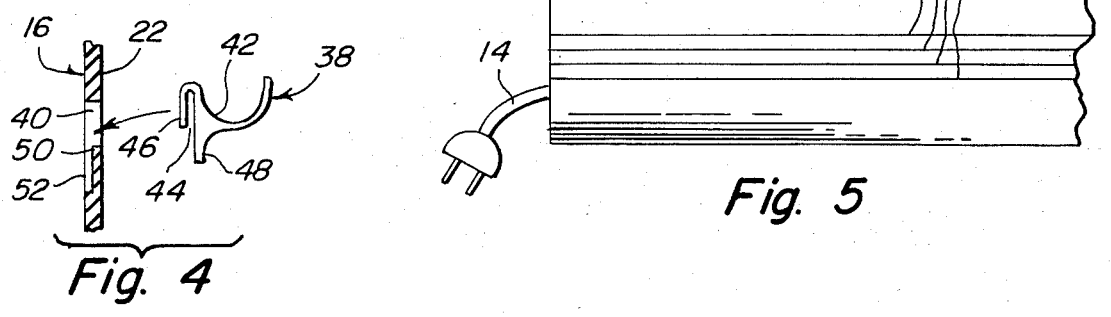
Fig. 4
Fig. 5

ALL PURPOSE WIRE CONCEALER

BACKGROUND OF THE INVENTION

This invention relates generally to decorative devices for room interiors. More specifically it relates to electrical wiring accessories.

It is well known that in most homes and offices various electrical objects, such as electric clocks, are often hung on a wall with the wires therefrom left hanging loosely along the wall down to the electric outlet socket. Likewise, wiring to floor and table lamps as well as wires to a television or radio set is usually just left along an edge of the floor so as to be out of the way. All this creates a messy appearance and is accordingly in need of an improvement.

SUMMARY OF THE INVENTION

Therefore it is a principal object of the present invention to provide a shield over the wiring which conceals it from view so as not to detract from the appearance of a room.

Another object is to provide a wire concealing shield which is quickly and easily installed, and which can be painted to match a wall so as to be less noticeable in view.

Still another object is to provide a wire concealer which promotes safety by preventing access of small children to pull on loose electric wires, and which prevents persons from tripping on loose wires left lying on a floor.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings, are briefly described as follows:

FIG. 1 is a front view of the invention shown installed on a wall to conceal electric wiring to a clock and also a lamp.

FIG. 2 is an enlarged end view taken on line 2—2 of FIG. 1, illustrating examples of several wires being concealed by the instant invention.

FIG. 3 is a fragmentary perspective view of the device, shown with the cover open.

FIG. 4 is an enlarged cross sectional view taken on line 4—4 of FIG. 3.

FIG. 5 is a broken partial front elevational view of the device, shown with the cover closed.

DETAILED DESCRIPTION OF PREFERRED EMBODIMENTS

Referring now to the Drawing in greater detail, the reference numeral 10 represents an all purpose wire concealer, according to the present invention, wherein there is an elongated one-piece molding member 12 which is preferably made of extruded plastic or rubber material that can be readily cut to desired lengths during an installation. The molding member essentially comprises an elongated tube for enclosing electrical wires 14 running through it and which is longitudinally split open so as to admit the wires in it. It includes a base portion 16 for mounting against a supporting wall 18, and a cover portion 20 which pivots into a closed position in front of the wires and enclosing them.

The base comprises a relatively thickened flat panel 22 so as to be stiff against bending. One longitudinal side edge thereof junctions with one longitudinal side edge of the cover that includes a flexible bend 24. An opposite longitudinal side edge of the panel is made with a forwardly extending bead 26 having a groove 28 on its front side and into which a bent over tongue 30 formed along an opposite edge of the cover is insertable, as shown in FIG. 2. The instant invention is manufactured so that in a normally relaxed position the cover is in an outwardly pivoted position, as shown by the solid lines in FIG. 3, so as to admit the wires into the device. The cover may be made slightly outwardly arched, as shown, and a plurality of ribs 32 may be made on its outer side for decorative purpose if so wished. A plurality of mounting holes 34 along the base are provided for receiving screws 36 in order to mount the device on a wall or the like.

The present invention also includes a set of hooks 38 which are removably mounted inside the molding member 12 for the purpose of securing one or more of the wires 14 thereto; the hooks being attachable in slots 40 arranged in spaced apart, longitudinal and transverse rows on the base. Each hook includes a generally semi-circular saddle 42 against which the wire is seated and snapped therein. The hook also includes a slot 44 between legs 46 and 48 for fitting around a lip 50 of the slot, with the leg 46 fitting in a recess 52 so to be flush with the rear side of the base.

In use, the molding member is mountable in any direction on the wall so as to reach between an electric outlet 54 and either a clock 56, a lamp 58, a television set 60, etc. as shown in FIG. 1. After the wires are installed therein, the cover is snapped in closed position, as shown in FIG. 2.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An all purpose wire concealer, comprising, in combination, a tubular, elongated, one piece molding member for covering a plurality of electric wires when extending therethrough, said molding member comprising an elongated base and an elongated cover pivotally connected together along one longitudinal edge and detachably connectable along an opposite longitudinal edge, a plurality of spaced apart longitudinal and transverse rows of individual slots in said elongated base, and a plurality of hooks removably mounted into selective slots and defining channels within said molding member of variably selective spacing to accommodate differing wire sizes, each channel being adapted to receive a single electric wire therein, whereby when electric wires are placed in the channels, they will be separated from each other.

2. The combination as set forth in claim 1, wherein said molding member is made of resilient material selected from the group consisting of plastic and rubber.

3. The combination as set forth in claim 2, wherein said base includes mounting means independent of said slots for attachment to a wall or the like.

4. The combination of set forth in claim 1, wherein each of said hooks comprises an arm inserted into a slot, and each slot comprises a recess formed into the rear of the base and accommodating an arm.

* * * * *